United States Patent [19]

Yamada et al.

[11] Patent Number: 4,752,530
[45] Date of Patent: Jun. 21, 1988

[54] MAGNETIC RECORDING MEDIUM

[75] Inventors: Yasuyuki Yamada; Yoshito Mukaida, both of Kanagawa, Japan

[73] Assignee: Fuji Photo Film Co., Ltd., Kanagawa, Japan

[21] Appl. No.: 795,607

[22] Filed: Nov. 6, 1985

[30] Foreign Application Priority Data

Nov. 6, 1984 [JP] Japan ................. 59-233739

[51] Int. Cl.$^4$ ............................................. G11B 5/702
[52] U.S. Cl. ......................... 428/425.9; 252/62.54; 427/128; 428/522; 428/694; 428/900
[58] Field of Search ............ 428/694, 695, 425.9, 428/522, 900; 427/128; 360/134–136; 252/62.54

[56] References Cited

U.S. PATENT DOCUMENTS

| 4,152,485 | 5/1979 | Mizumura | 428/425.9 |
|---|---|---|---|
| 4,352,859 | 10/1982 | Yoda | 428/425.9 |
| 4,400,435 | 8/1983 | Yoda | 428/425.9 |
| 4,404,253 | 9/1983 | Kohler | 428/425.9 |
| 4,411,957 | 10/1983 | Tokuda | 428/900 |
| 4,420,531 | 12/1983 | Tokuda | 428/900 |
| 4,431,712 | 2/1984 | Matsufuji | 428/694 |
| 4,492,734 | 1/1985 | Ogawa | 428/900 |
| 4,503,120 | 3/1985 | Yamauchi | 428/694 |
| 4,521,486 | 6/1985 | Ninomiya | 428/694 |
| 4,529,661 | 7/1985 | Ninomiya | 428/900 |
| 4,560,617 | 12/1985 | Nishimatsu | 427/44 |
| 4,571,364 | 2/1986 | Kasuga | 428/329 |
| 4,613,545 | 9/1986 | Chubachi | 428/329 |

Primary Examiner—Ellis P. Robinson
Attorney, Agent, or Firm—Sughrue, Mion, Zinn, Macpeak, and Seas

[57] ABSTRACT

A magnetic recording medium is described, comprising a non-magnetic support having provided thereon a magnetic layer including ferromagnetic powder and a binder comprising a polyurethane resin having a metal salt group of sulfonic acid and vinyl chloride/vinyl acetate-based copolymer containing from 0.2 wt. % to less than 1.5 wt. % of maleic acid. The magentic recording medium has reduced deterioration of the video S/N ratio under high temperature and high humidity.

5 Claims, No Drawings

MAGNETIC RECORDING MEDIUM

FIELD OF THE INVENTION

The present invention relates to a magnetic recording medium, and more particularly it relates to a magnetic recording medium comprising an improved binder having excellent durability under harsh conditions of higher temperature and higher humidity than normal temperature and humidity conditions.

BACKGROUND OF THE INVENTION

Recently, as magnetic recording media have been used in increasingly various fields, electromagnetic properties and various other characteristics have been required to be improved.

For this purpose, various studies and improvements have been made to improve a binder composition in a magnetic material.

However, hitherto obtained binder compositions have both merits and demerits, and satisfactory binder compositions meeting various combination requirements have not yet been obtained.

As binders for a magnetic recording medium, cellulose derivatives, vinyl chloride/vinyl acetate copolymers, polyurethane resins, acrylic type resins and copolymers thereof, vinylidene chloride and copolymers thereof, epoxy resins, phenoxy resins, synthetic rubbers, and polyesters have been conventionally used, alone or in combination. Among these binders, the combination of a polyurethane resin and a vinyl chloride/vinyl acetate copolymer, and that of a polyurethane resin and nitrocellulose are typical examples of binders used, as described in U.S. Pat. Nos. 4,414,288, 4,423,115, 4,431,700 and 4,409,291.

However, the above combinations have been unable to fully satisfy desired properties for dispersibility of magnetic particles and wear resistance. Particularly, where fine ferromagnetic powders having a BET specific surface area of 30 m$^2$/g or more are used, it has not been possible to attain a satisfactory friction coefficient in addition to satisfactory dispersibility and wear resistance.

In order to solve the above problems, it has been described, for example, in Japanese Patent Application (OPI) Nos. 41435/83, 13519/81, 105429/83, 105430/83, 70424/83, 70425/83 and U.S. Pat. No. 4,423,115 that magnetic recording media using various binders have been developed. So, although the above problems have partially been solved by the above prior arts, but deterioration of the S/N (signal/noise) ratio under harsh conditions of a higher temperature (higher than 30° C.) and a higher humidity (higher than 65%RH) has not been prevented nor reduced.

SUMMARY OF THE INVENTION

An object of the present invention is to provide a magnetic recording medium having excellent durability under harsh conditions of a higher temperaure and a higher humidity, and having reduced deterioration of the video S/N ratio.

Thus, the present invention is directed to a magnetic recording medium comprising a non-magnetic support having provided thereon a magnetic layer including ferromagnetic powder and a binder comprising a polyurethane resin having a metal salt group of sulfonic acid and a vinyl chloride/vinyl acetate-based copolymer containing, as a monomer component, maleic acid in an amount of from 0.2 to less than 1.5 wt%.

DETAILED DESCRIPTION OF THE INVENTION

The present invention is described in more detail hereinbelow.

A polyurethane resin having a metal salt group of sulfonic acid used in the present invention preferably has a number average molecular weight of from 10,000 to 100,000, a degree of polymerization of from about 200 to 2,000, a glass transition temperature of from 0° C. to 90° C., and a metal salt group of sulfonic acid of from 1 to 1,000 equivalent/10$^6$ g, more preferably from 2 to 500 equivalent/10$^6$ g and most preferably from 5 to 100 equivalent/10$^6$ g. Examples of the metal include Na, K, and Li. Regarding mechanical characteristics, the polyurethane resin preferably has an initial modulus of elasticity of from 20 to 200 kg/mm$^2$, a tearing strength of from 2 to 10 kg/mm$^2$, and a tearing elongation of from 3 to 800%.

The polyurethane resin having a metal salt group of sulfonic acid can be produced in a conventional manner, for example, by reacting a polyol with an organic acid having a metal salt group of sulfonic acid, reacting the resulting polyol with a dibasic acid to form a polyester polyol, followed by reacting with a polyisocyanate.

The vinyl chloride/vinyl acetate-based copolymer containing maleic acid used in the present invention preferably has a number average molecular weight of from 8,000 to 100,000, and an average degree of polymerization of from about 250 to 1,000. The maleic acid content is from 0.2 to less than 1.5 wt%, preferably from 0.5 to 1.3 wt%, based on the total weight of the copolymer. Trademarks of commercially available products thereof are VMCH and VMCC prepared by U.C.C., and MPR-TM manufactured by Nisshin Kagaku Co., Ltd.

Further, in addition to the above described copolymer components, a monomer such as vinyl alcohol, maleic anhydride, acrylonitrile, acrylic acid, methacrylic acid, or acrylic ester can be copolymerized or graft-polymerized therewith. These monomers can be contained in an amount of from 0.1 to 25 wt% based on the total weight of the copolymer.

A mixing weight ratio of vinyl chloride to vinyl acetate in the copolymer is generally from 60/40 to 95/5, and preferably from 70/30 to 90/10.

As a mixing ratio of these binders, the vinyl chloride/vinyl acetate-based copolymer containing maleic acid is generally used in an amount of from 20 to 65 wt%, preferably from 30 to 55 wt%, and the polyurethane resin containing a metal salt group of sulfonic acid is used in an amount of from 80 to 35 wt%, preferably from 70 to 45 wt%, based on the combined weight of the resin and copolymer.

If the vinyl chloride/vinyl acetate-based copolymer is used in an amount of less than 20 wt%, dispersibility of the magnetic particles is deteriorated, and if it is used in an amount of more than 65 wt%, fragile magnetic tapes may be obtained, and the magnetic layer may separate from the support at the edge portions.

If the amount of the polyurethane resin is less than 35 wt%, adhesion between a magnetic layer and a support is deteriorated, and if it exceeds 80 wt%, surface properties are deteriorated and the tapes become sticky and adhere in many cases.

The binder can be added in an amount of from 10 to 80 parts by weight, preferably from 18 to 40 parts by weight, per 100 parts by weight of ferromagnetic powders.

A stronger magnetic layer can be obtained by adding polyisocyanate to the above described binder composition.

Polyisocyanate used in the present invention includes di-, tri-, and tetraisocyanates selected from aliphatic compounds, aromatic compounds, and alicyclic compounds having two or more —N=C=O groups in a molecule.

Examples of polyisocyanates include ethane diisocyanate, butane diisocyanate, hexane diisocyanate, 2,2-dimethylpentane diisocyanate, 2,2,4-trimethylpentane diisocyanate, decane diisocyanate, ω,ω'-diisocyanate-1,3-dimethylbenzole, ω,ω'-diisocyanate-1,2-dimethylcyclohexane, ω,ω'-diisocyanate-1,4-diethylbenzole, ω,ω'-diisocyanate-1,5-dimethylnaphthalene, ω,ω'-diisocyanate-n-propylbiphenyl, 1,3-phenylene diisocyanate, 1-methylbenzole-2,4-diisocyanate, 1,3-dimethylbenzole-2,6-diisocyanate, naphthalene-1,4-diisocyanate, 1,1'-dinaphthyl-2,2'-diisocyanate, biphenyl-2,4'-diisocyanate, 3,3'-dimethylbiphenyl-4,4'-diisocyanate, diphenylmethane-4,4'-diisocyanate, 2,2'-dimethyldiphenylmethane-4,4'-diisocyanate, 3,3'-dimethoxydiphenylmethane-4,4'-diisocyanate, 4,4'-diethoxydiphenylmethane-4,4'-diisocyanate, 1-methylbenzole-2,4,6-triisocyanate, 1,3,5-trimethylbenzole-2,4,6-triisocyanate, diphenylmethane-2,4,4'-triisocyanate, triphenylmethane-4,4',4''-triisocyanate, tolylene diisocyanate, 1,5-naphthylenediisocyanate; dimers or trimers thereof; and adduct products of these isocyanates and polyhydric alcohols such as divalent alcohol or trivalent alcohol, for example, adduct products of trimethylol propane with tolylene diisocyanate or hexamethylene diisocyanate.

Polyisocyanate can be added in an amount of from 5 to 100 parts by weight, preferably from 20 to 70 parts by weight, based on 100 parts by weight of the binder composition.

Examples of ferromagnetic powders which can be used in the present invention include ferromagnetic iron oxide powder, ferromagnetic chromium dioxide powder, ferromagnetic metal powder, etc. Of these, ferromagnetic metal powder is preferably used in the present invention.

The above-described ferromagnetic iron oxide is one having the general formula $FeO_x$ wherein x is in the range of $1.33 \leq x \leq 1.50$, that is, maghemite ($\gamma$-$Fe_2O_3$; $x=1.50$), magnetite ($Fe_3O_4$; $x=1.33$) or the Berthollide compounds thereof ($FeO_x$; $1.33<x<1.50$). The above-described x is represented by the following formula:

$$x = \frac{1}{2 \times 100} \times \left(2 \times \begin{pmatrix} \text{Atomic \% of} \\ \text{divalent ion} \end{pmatrix} + 3 \times \begin{pmatrix} \text{Atomic \% of} \\ \text{trivalent ion} \end{pmatrix}\right)$$

To these ferromagnetic iron oxides may be added divalent metals. Examples of such divalent metals are Cr, Mn, Co, Ni, Cu, Zn, etc. and they can be added in an amount of 0 to about 10 atomic% based on the iron oxide.

The above-described ferromagnetic chromium dioxide which can be used includes $CrO_2$ per se and $CrO_2$ to which 0 to about 20 wt% of metals such as Na, K, Ti, V, Mn, Fe, Co, Ni, Tc, Ru, Sn, Ce, Pb, etc., semi metals such as P, Sb, Te, etc. or oxides of these metals has been added.

The above-described ferromagnetic metal powder is one which contains about 75 wt% or more metal component, with about 80 wt% or more of the metal component being at least one ferromagnetic metal (i.e., Fe, Co, Ni, Fe-Co, Fe-Ni, Co-Ni or Co-Ni-Fe) and about 20 wt% or less, preferably 0.5 to 5 wt%, of the metal component being Al, Si, S, Sc, Ti, V, Cr, Mn, Cu, Zn, Y, Mo, Rh, Pd, Ag, Sn, Sb, Te, Ba, Ta, W, Re, Au, Hg, Pb, Bi, La, Ce, Pr, Nb, B, P, etc. In some cases, the ferromagnetic metal contains a slight amount of water, hydroxides or oxides.

The ferromagnetic powders used in the present invention preferably have a BET specific surface area of from 30 to 70 m²/g, and more preferably from 45 to 60 m²/g.

Lubricating agents, organic solvents, other additives, supports used in the present invention and methods for preparing a magnetic recording medium are disclosed in Japanese Patent Publication No. 26890/81 and U.S. Pat. No. 4,135,016 and can be applied in the present invention, if desired.

The present invention is further illustrated in more detail by the following Examples. However, the present invention is not limited to the following examples. In the Examples, all parts are by weight.

| (A) | Magnetic particles Co-containing $\gamma$-$Fe_2O_3$ HC: 630 Oe Particle size: 0.4 × 0.05 × 0.05 μm | 300 parts |
|---|---|---|
| (B) | Vinyl chloride/vinyl acetate copolymer containing maleic acid (vinyl chloride/vinyl acetate/maleic acid: 86/13/1 by weight; average degree of polymerization: 410) | 28 parts |
| (C) | Polyurethane resin (content of —$SO_3Na$ group: 20 equivalent/$10^6$ g; number average molecular weight: 30,000; initial modulus of elasticity: 100 kg/mm²; tearing strength: 8 kg/mm²; tearing elongation: 150%) | 38 parts |
| (D) | Electroconductive carbon black (average particle diameter: 30 mμ) | 20 parts |
| (E) | Oleic acid | 3 parts |
| (F) | Stearic acid | 3 parts |
| (G) | Butyl stearate | 2 parts |
| (H) | Methyl ethyl ketone/toluene (weight ratio: 1/1) | 700 parts |

The above composition was mixed and dispersed in a ball mill. 18 parts of a 75 wt% ethyl acetate solution of three functional polyisocyanate compound obtained by addition reaction of 3 moles of toluene diisocyanate and 1 mole of trimethylol propane ("Desmodur L-75", manufactured by Bayer A.G.) was dissolved into 200 parts of methyl ethyl ketone/toluene and added to the above dispersion to prepare a magnetic coating composition. The coating composition was coated on a polyester support having a 15 μm thickness to provide a magnetic layer having a dry thickness of 5 μm and was subjected to surface treatment using a calender roll.

The thus-obtained magnetic web was slit to a ½ inch width to prepare a magnetic tape. This sample tape was designated as Sample No. 1.

EXAMPLES 2 TO 5

The same procedure as in Example 1 was repeated to prepare Sample Nos. 2 to 5, except changing components (A), (B), and (C) to those as shown in Table 1.

TABLE 1

| Example | (A) | (B) | (C) |
|---|---|---|---|
| 2 | Fe—Co alloy particle (BET specific surface area: 38 m$^2$/g; HC = 650 Oe) | Copolymer of vinyl chloride, vinyl acetate and maleic acid (91/7.6/1.4 wt %; average degree of polymerization: 410) | Same as that in Example 1 |
|   | 300 parts | 25 parts | 30 parts |
| 3 | Co-containing Fe$_3$O$_4$ (Hc = 630 Oe; particle size: 0.3 × 0.05 × 0.05 μm) | Same as that in Example 1 | Polyurethane resin (content of sodium sulfonate: 80 equivalent/10$^6$ g; number average molecular weight: 45,000; initial modulus of elasticity: 150 kg/mm$^2$; tearing strength: 9 kg/mm$^2$; tearing elongation: 120%) |
|   | 300 parts | 38 parts | 40 parts |
| 4 | Same as that in Example 1 | Copolymer of vinyl chloride, vinyl acetate and maleic acid (95/4.5/0.2 wt %; average degree of polymerization: 500) | Same as that in Example 3 |
|   | 300 parts | 28 parts | 38 parts |
| 5 | Same as that in Example 2 | Copolymer of vinyl chloride, vinyl acetate and maleic acid (97/2.2/0.8 wt %; average degree of polymerization: 410) | Polyurethane resin (content of potassium sulfonate: 8 equivalent/10$^6$ g; number average molecular weight: 45,000; initial modulus of elasticity: 130 kg/mm$^2$; tearing strength: 6 kg/mm$^2$; tearing elongation: 28% |
|   | 300 parts | 25 parts | 30 parts |

COMPARATIVE EXAMPLES 1 TO 5

The same procedure as in Example 1 was repeated to prepare Nos. C1 to C5 changing components (B) and (C) in Examples 1 to 5, respectively, as shown in Table 2.

TABLE 2

| Comparative Example | (B) | (C) |
|---|---|---|
| 1 | Copolymer of vinyl chloride, vinyl acetate and maleic acid (87/8/5 wt %; average degree of polymerization: 420) | Polyurethane resin (—SO$_3$Na group not present; number average molecular weight: 25,000; initial modulus of elasticity: 100 kg/mm$^2$; tearing strength: 10 kg/mm$^2$; tearing elongation: 120% |
|   | 28 parts | 38 parts |
| 2 | Same as that in Comparative Example 1 | Same as that in Example 1 |
|   | 25 parts | 30 parts |
| 3 | Same as that in Example 1 | Same as that in Comparative Example 1 |
|   | 38 parts | 40 parts |
| 4 | Copolymer of vinyl chloride, vinyl acetate and vinyl alcohol (91/3/6 wt %; average degree of polymerization: 420) | Same as that in Example 5 |
|   | 28 parts | 38 parts |
| 5 | Copolymer of vinyl chloride and vinyl acetate (86/14 wt %; average degree of polymerization: 380) | Same as that in Example 3 |
|   | 25 parts | 30 parts |

Regarding these samples and comparative samples, video sensitivities, video S/N, and decrease of video S/N of tapes after repeated run for 100 times at high temperature and high humidity were measured, and the results thereof are shown in Table 3.

Video sensitivity (dB):
Video sensitivity is shown as a relative value when video sensitivity of Sample No. 1 is deemed as a standard one having ±0 dB.

Video S/N (dB):
Video S/N is shown as a relative value when video S/N of Sample tape No. 1 is deemed as a standard one having ±0 dB.

Decrease of video S/N after repeated run for 100 times (db):
Decrease of video S/N is shown by a relative value measured after repeated run of tapes of five minutes length for 100 times where initial video S/N of each sample tape is deemed to be a standard one having ±0 dB. It was measured after the repeated run under conditions of 23° C. and 50% RH and 40° C. and 80% RH.

TABLE 3

| Sample No. | Video Sensitivity (dB) | Video S/N (dB) | Decrease of video S/N after repeated run for 100 times | |
|---|---|---|---|---|
|   |   |   | 23° C., 50% RH (dB) | 40° C., 80% RH (dB) |
| 1 | 0 | 0 | −0.1 | −0.1 |

TABLE 3-continued

| Sample No. | Video Sensitivity (dB) | Video S/N (dB) | Decrease of video S/N after repeated run for 100 times | |
|---|---|---|---|---|
| | | | 23° C., 50% RH (dB) | 40° C., 80% RH (dB) |
| 2 | −0.1 | −0.1 | −0.1 | −0.2 |
| 3 | +0.1 | +0.1 | −0.2 | −0.2 |
| 4 | 0 | −0.1 | −0.2 | −0.4 |
| 5 | −0.1 | +0.1 | −0.1 | −0.3 |
| C1 | 0 | −0.1 | −0.2 | −0.9 |
| C2 | −0.1 | −0.1 | −0.2 | −1.2 |
| C3 | −0.1 | −0.1 | −0.3 | −1.3 |
| C4 | −0.2 | −0.2 | −0.3 | −1.2 |
| C5 | −0.2 | 0 | −0.4 | −1.1 |

It is clear from the results in Table 3 that sample tapes using the binders of the present invention exhibit remarkably improved results in comparison with the comparative sample tapes using conventional binders regarding video S/N deterioration measured after repeated run at a high temperature of 40° C. and a high humidity of 80% RH.

The present invention is an excellent magnetic recording medium having reduced video S/N deterioration after repeated running, particularly under harsh conditions of high temperature and high humidity.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a nonmagnetic support having provided thereon a magnetic layer including ferromagnetic powder and a binder comprising a polyurethane resin having a metal salt group of sulfonic acid and a copolymer comprising vinyl chloride and vinyl acetate containing, as a monomer component, maleic acid in an amount of from 0.2 to less than 1.5 wt%, wherein the copolymer comprising vinyl chloride and vinyl acetate is used in an amount of from 20 to 65 wt%, and the polyurethane resin containing a metal salt group of sulfonic acid is used in an amount of from 80 to 35 wt%, based on the total weight of the binder, wherein the polyurethane resin has a number average molecular weight of from 10,000 to 100,000, degree of polymerization of from about 200 to 2,000, a glass transition temperature of from 0° to 90° C., a metal salt group of sulfonic acid of from 1 to 1,000 eq/$10^6$, an initial modulus of elasticity of from 20 to 200 kg/mm$^2$, a tearing strength of from 2 to 10 kg/mm$^2$, a tearing elongation of from 3 to 800%, wherein the copolymer comprising vinyl chloride and vinyl acetate has a number average molecular weight of from 8,000 to 100,000 and an average degree of polymerization of from 250 to 1,000, and wherein the mixing weight ratio of vinyl chloride to vinyl acetate in the copolymer comprising vinyl chloride and vinyl acetate is from 60/40 to 95/5.

2. A magnetic recording medium as in claim 1, wherein the magnetic layer further contains polyisocyanate.

3. A magnetic recording medium as in claim 1, wherein the polyurethane resin has a metal salt group of sulfonic acid of from 2 to 500 eq/$10^6$ g.

4. A magnetic recording medium as in claim 3, wherein the metal of the metal salt is Na, K or Li.

5. A magnetic recording medium as in claim 4, wherein the maleic acid as a monomer component is present in an amount of from 0.5 to 1.3 wt%, based on the total weight of the copolymer.

* * * * *